Nov. 25, 1958 S. G. ELLIS 2,861,909

SEMICONDUCTOR DEVICES

Filed April 25, 1955

INVENTOR.
SIDNEY G. ELLIS
BY J. C. Whittaker
ATTORNEY

United States Patent Office 2,861,909
Patented Nov. 25, 1958

2,861,909

SEMICONDUCTOR DEVICES

Sidney G. Ellis, Princeton Junction, N. J., assignor to Radio Corporation of America, a corporation of Delaware Application April 25, 1955, Serial No. 503,733

7 Claims. (Cl. 148—33)

This invention relates generally to semiconductor devices and, particularly although not exclusively, to large area semiconductor devices and electrical contacts therefor, and to methods of making such contacts.

In some forms of semiconductor devices such as semiconductor photocells, it is desirable to have a surface layer of one conductivity-type material covering a comparatively large area of a body of another conductivity-type material and separated from the body by a rectifying barrier. Generally, an electrical contact is made to one edge of the surface layer. However, this type of construction is comparatively inefficient since, with an edge contact, many charge carriers generated at a distance from the contact cannot be collected and the sensitivity of the device is reduced.

Among the objects and purposes of this invention are those to provide an improved semiconductor device and an improved large-area contact therefor, and to provide improved methods of making an efficient large-area electrical current collecting contact therefor.

In general, semiconductor materials are of two conductivity types. One type is known as N-type, in which electrons predominate and conduction is effected by the movement of free electrons. The other type is known as P-type in which positive holes predominate and in which conduction is effected by the movement of the positive holes which arise from electron vacancies in the electron orbital structures of the atoms of the semiconductor material. Thus, in N-type material, electrons are the majority charge carriers and positive holes are the minority charge carriers. In P-type material, positive holes, are the majority charge carriers and electrons are the minority charge carriers.

N-type semiconductor material may be characterized by the presence therein of a minute amount of impurities which are predominantly "donors," that is impurities such as antimony and phosphorus which "donate" additional free electrons to the semiconductor, while P-type semiconductor material may be characterized by the presence of impurities which are predominantly "acceptors," that is, impurities such as indium and aluminum which function to accept electrons from the semiconductor and leave "positive holes" in the atom structure thereof.

In general, the principles and objects of this invention are accomplished by providing a body of semiconductor material of one type of conductivity having a surface layer having some characteristics of material of another type of conductivity, said surface layer being separated from said body by a rectifying barrier. A metallic fine mesh grid is in ohmic contact with the surface layer and is employed as a means for collecting current from the body and the surface layer.

In one embodiment of the invention, the current collecting grid comprises a grid or mesh of wires or lines of a suitable metallic impurity material alloyed with or fused to the surface of a semiconductor crystal of one type of conductivity (e. g. P-type). The alloying or fusion process forms a similar grid of material of a type of conductivity different from that of the body (e. g. N-type) between the grid of impurity material and the body. The N-type grid thus formed is separated from the body by a rectifying barrier and is in ohmic (non-rectifying) contact with the grid of impurity material which constitutes the current collecting electrode of the device. The surface of the body between the wires of the grid is treated, for example, by chemical action, to provide a surface inversion layer which has some electrical characteristics different from that of the body on which it is formed. In this case, the surface inversion layer has N-type electrical characteristics, that is, electrons comprise the majority charge carriers therein. In this way, the surface inversion layer of N-type characteristics and the N-type alloyed grid combine to constitute, in effect, a surface layer of N-type conductivity material on the P-type body.

The invention is described in greater detail by reference to the drawing wherein.

Figure 1:
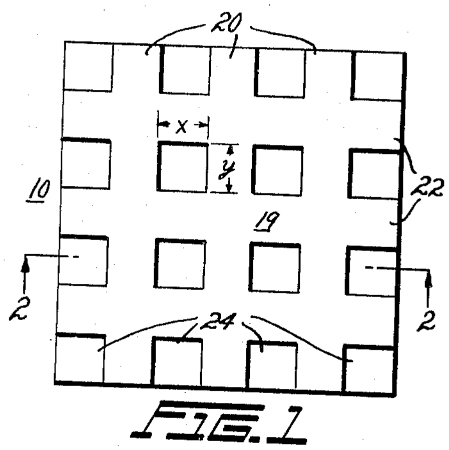
Fig. 1 is a plan view of a device embodying the principles of the invention.
Figure 2:
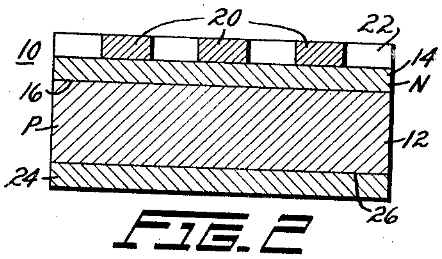
Fig. 2 is a sectional view along the line 2—2 in Fig. 1.

The principles of the invention are described herein, referring to Figures 1 and 2, with reference to a semiconductor photocell 10 which includes a body or crystal of semiconductor material 12, for example, germanium, silicon or the like of N-type or P-type conductivity. For the purposes of the present invention the crystal 12 will be assumed to be P-type germanium. The crystal 12 is provided with a thin surface layer 14 of N-type conductivity material separated therefrom by a rectifying barrier 16. The N-type layer is thin enough to allow radiation 18 to penetrate therethrough into the P-type region of the crystal.

According to the invention, a fine mesh metallic grid 19 comprising a plurality of mutually perpendicular lines of a metal is provided in ohmic (non-rectifying) contact with the surface layer 14. The grid 19 includes a first set of parallel small area lines 20 and a second set of small area parallel lines 22 perpendicular to the lines 20. The lines 20 and 22 are spaced apart such a distance that the spacings "$x$" and "$y$" between any two adjacent lines is no greater than twice the diffusion length of minority charge carriers in the P-type crystal 12. Thus, current collecting grid lines are available within collecting range of charge carriers generated substantially anywhere near the surface of the crystal 12.

A base electrode 24 is bonded in ohmic (non-rectifying) contact to the crystal 12, for example, on a surface 26 opposite the grid 19.

A photocell embodying the principles of the invention may be prepared (Fig. 3*a*) in the following manner in accordance with the invention. First, referring to Figure 4, a semiconductor crystal 28 is cut from a length of single crystalline P-type germanium and is suitably treated, for example, by grinding, etching and polishing and the like to prepare it for an impurity alloying operation. A grid 30 (Fig. 4) of a suitable conductivity-determining impurity material, for example, an alloy of 90% lead and 10% antimony (the antimony being the conductivity-determining substance) is formed on a surface 32 of the crystal 28 in the pattern of the grid 19 described above and with the aforementioned spacing between the lines thereof. The impurity material may be deposited as thin lines by electroplating, evaporation or the like through a suitable screen or mask placed on the surface of the crystal or spaced a suitable distance therefrom. In one arrangement, a mask having a plurality of suitably spaced parallel slots is first placed in one position and the impurity material comprising one set of parallel lines 34 of the grid 30 is deposited on the surface of the crystal. Then, the mask is rotated 90° and the other set of lines 36 is formed.

After the desired grid 30 of lines of impurity material has been thus formed, it is alloyed with or fused to the crystal 28 by an alloying or fusion technique of the general type described in a paper by Law et al. entitled "A Developmental Germanium P-N-P Junction Transistor" in the November 1952 Proceedings of the IRE. The desired alloying is achieved by heating the assembly of semiconductor crystal and grid 30 of impurity material for about five minutes at about 500° C.

In the alloying process, the impurity material of the grid 30 melts and dissolves some of the germanium with which it is in contact. When the assembly is cooled and the molten materials recrystallize, a grid of thin regions of N-type material 38 (Fig. 5) is formed adjacent to the body of the crystal 28 with each N-type region separated therefrom by a rectifying barrier 40. The remaining portions 42 of the former impurity grid adjacent to the N-type portions 38 recrystallize as an alloy of the impurity material and the germanium of the body. These portions are metallic in character and are in ohmic contact with the N-type regions 38 and, in effect, comprise an electrical connection thereto. A base electrode 42 of nickel or the like, is then soldered to the crystal 28.

Next, the crystal 28 having the base electrode 42 and the grid including the N-type portions 38 and metallic portions 42 is cleaned, for example, by etching, and then it is dried. Surface inversion layers 38′ having some of the same electrical characteristics as the N-type grid portions 38 are then provided on the crystal 28 between the portions 42 of the grid 30 by immersing the crystal in hydrogen peroxide for about 30 seconds and then washing in water, and drying. The inversion layers 38′, in effect, are separated from the crystal 28 by rectifying barriers 40′. The inversion layers 38′ combine with the N-type regions 38 to provide, in effect, an N-type layer over the entire surface of the crystal 28. Similarly the rectifying barriers 40 and 40′ combine to form, in effect a single rectifying barrier between the single N-type layer and the P-type body 42. At the same time, the portions 42 of the grid comprise a fine mesh metal contact to the N-type surface layer.

The theory underlying the formation of the inversion layer by means of the foregoing hydrogen peroxide treatment is that ions combine with the surface of the crystal and attract electrons into a surface layer of the order of $10^{-4}$ cm. thick. Thus, since the surface layer has an excess of electrons, it is inverted from P-type to N-type in its conductivity characteristic. However, its conductivity may not be of the same magnitude as the N-type regions 38. Substantially any substance which provides this type of action may be employed to form the surface inversion layer.

Figures 3, 4, 5:
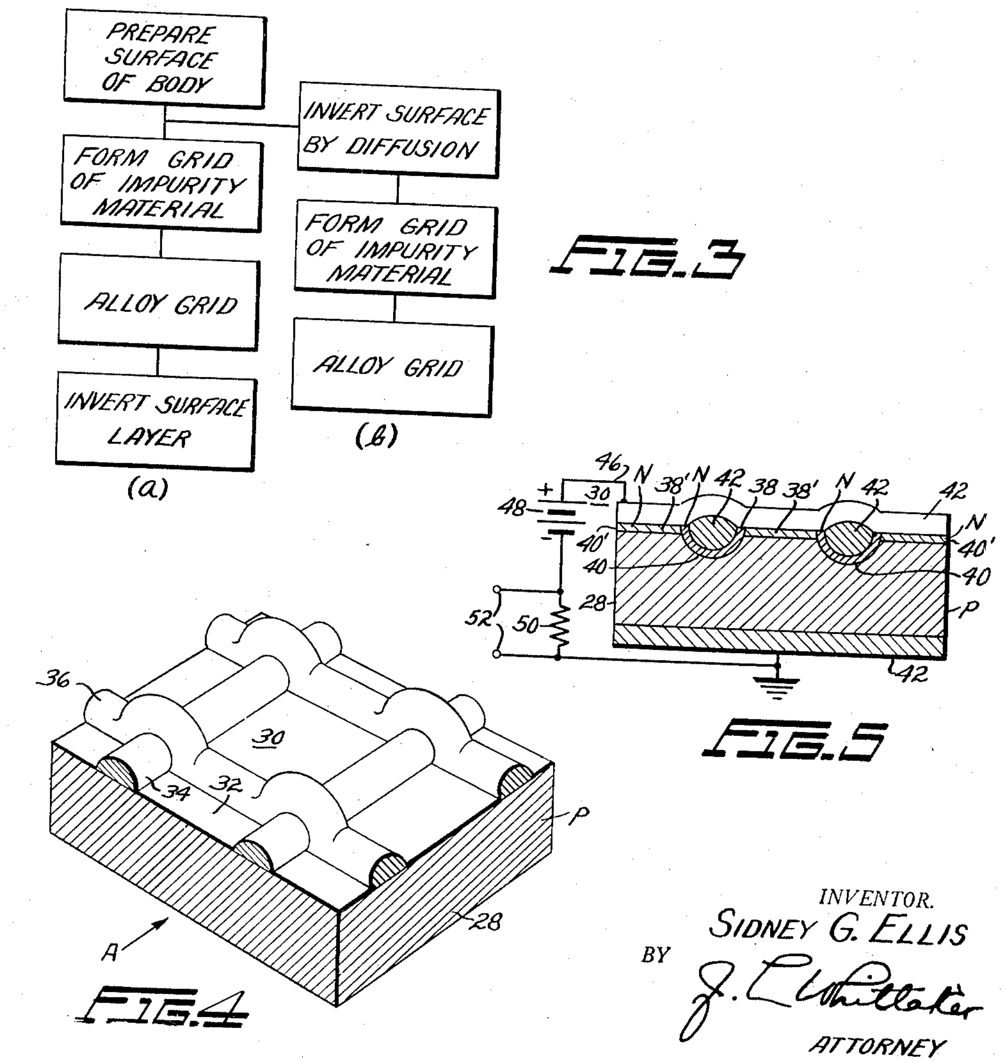
Fig. 3 is a flow charge showing the steps of two processes for preparing a device embodying the principles of the invention.
Fig. 4 is a perspective view of a device at one stage in its preparation according to the invention; and, Fig. 5 is a sectional elevational view looking in the general direction of the arrow A in Fig. 4 of a device embodying the principles of the invention and prepared by one of the processes shown in Fig. 3 and a schematic representation of a circuit in which the device may be operated.

In the foregoing process, the grid of N-type material 38 may also be formed by a diffusion process which comprises, essentially, heating the assembly of crystal 28 and grid 30 of impurity material as shown in Figure 4 at a temperature of the order of 900° C. for a time of the order of several days.

A device embodying the principles of the invention may be made by another process referring to Figure 3*b* by which a continuous surface inversion layer is first formed by diffusion of impurity atoms into a surface of the semiconductor crystal 28 and then a grid of impurity material is deposited thereon and is alloyed into the same surface in the manner described above.

Devices of the type described above, referring to Figure 4, may be operated in a circuit in which a lead 46 is connected to a selected point on a portion 42 of the alloyed grid 30 and is coupled to the positive terminal of a battery 48 the negative terminal of which is connected through a load impedance 50 to the base electrode 42. The rectifying barrier formed by co-action of the barriers 40 and 40′ between the effective N-type surface layer and the P-type crystal 28 is thus biased in the reverse direction. The base electrode 42 is connected to a source of reference potential such as ground. Output terminals 52 are coupled to the load impedance 50.

In operation of the device of Figure 5, radiation 54 is directed toward and penetrates into and through the elements 38′ of the inversion layer and generates hole-electron pairs both in the inversion layer and in the portion of the crystal below it. The minority charge carriers in the body of the crystal 12, that is, electrons, are drawn across the rectifying barrier into the N-type layer and these electrons and those present in the inversion layer are collected in the portions 42 of the grid 30 and produce an output current in the load impedance 50.

What is claimed is:

1. A semiconductor device comprising a body of semiconductor material of one type of conductivity, a grid of semiconductor material having a conductivity-type opposite to said one type in rectifying contact with said body, said grid comprising a plurality of mutually perpendicular lines, any two adjacent elements of said grid being spaced apart a distance of the order of twice the diffusion length of minority charge carriers in said body, and a surface inversion layer on said body between said lines having said opposite type conductivity and being sufficiently thin to permit penetration of light therethrough.

2. A semiconductor device comprising a body of semiconductor material having a surface and being of one conductivity type, a junction-type semiconductor grid comprising a plurality of mutually intersecting elements in rectifying contact with a surface of said body, and an inversion layer at said surface of said body having a conductivity-type opposite to said one type and being sufficiently thin to permit penetration of light therethrough.

3. A semiconductor device comprising a body of semiconductor material having a surface and being of one conductivity type, a P-N junction grid comprising a plurality of mutually intersecting elements in rectifying contact with a surface of said body, the linear distance between adjacent elements being of the order of twice the diffusion length of minority charge carriers of said body, and an inversion layer at said surface of said body between the portions of said grid having a conductivity type opposite to said one type and being sufficiently thin to permit penetration of light therethrough.

4. A semiconductor device comprising a body of P-type germanium, a grid comprising a plurality of mutually intersecting elements of N-type germanium in rectifying contact with a surface of said body, the linear distance between adjacent elements being no greater than twice the diffusion length of minority charge carriers of said body, and an inversion layer at said surface of said body having N-type electrical characteristics and being sufficiently thin to permit penetration of light therethrough.

5. A semiconductor device comprising a body of P-type germanium, a grid of N-type germanium in rectifying contact with a surface of said body and comprising a plurality of mutually perpendicular lines, and an inversion layer at said surface of said body having N-type electrical characteristics and being sufficiently thin to permit penetration of light therethrough.

6. A semiconductor device comprising a body of P-type germanium, a grid of N-type germanium in rectifying contact with a surface of said body and comprising two sets of mutually perpendicular lines, and an inversion layer at said surface of said body having N-type electrical characteristics and being sufficiently thin to permit penetration of light therethrough.

7. A semiconductor device comprising a body of P-type germanium, a grid in rectifying contact with a surface of said body and comprising two sets of mutually perpendicular lines of N-type germanium, and an inversion layer at said surface of said body having N-type electrical characteristics and being sufficiently thin to permit penetration of light therethrough.

UNITED STATES PATENTS

References Cited in the file of this patent

| | | |
|---|---|---|
| 2,540,490 | Rittner | Feb. 6, 1951 |
| 2,561,411 | Pfann | July 24, 1951 |
| 2,644,852 | Dunlap | July 7, 1953 |
| 2,721,965 | Hall | Oct. 25, 1955 |
| 2,736,639 | Ellis | Feb. 28, 1956 |